(12) United States Patent
Conrad et al.

(10) Patent No.: US 6,984,364 B2
(45) Date of Patent: Jan. 10, 2006

(54) PROCESS AND APPARATUS FOR CHEMICAL CONVERSION

(75) Inventors: Wayne Ernest Conrad, Hampton (CA); Richard Stanley Phillips, Courtice (CA); Andrew Richard Henry Phillips, Oshawa (CA); Helmut Gerhard Conrad, Oshawa (CA)

(73) Assignee: ATI Properties, Inc., Albany, OR (US)

( * ) Notice: Subject to any disclaimer, the term of this patent is extended or adjusted under 35 U.S.C. 154(b) by 10 days.

(21) Appl. No.: 10/294,914

(22) Filed: Nov. 15, 2002

(65) Prior Publication Data

US 2003/0141180 A1   Jul. 31, 2003

Related U.S. Application Data

(63) Continuation of application No. 09/781,316, filed on Feb. 13, 2001, now Pat. No. 6,488,819, which is a continuation of application No. 08/336,242, filed on Nov. 7, 1994, now Pat. No. 6,309,514.

(51) Int. Cl.
*B01J 19/08* (2006.01)

(52) U.S. Cl. .................. 422/186.04; 422/186.07; 422/186.16

(58) Field of Classification Search ........... 422/186.04, 422/187.07, 186.16
See application file for complete search history.

(56) References Cited

U.S. PATENT DOCUMENTS

| | | | |
|---|---|---|---|
| 1,326,631 A | 12/1919 | Bayeux et al. | |
| 2,884,511 A | 4/1959 | Berghaus et al. | |
| 3,024,185 A | 3/1962 | Fleck | |
| 3,214,364 A | 10/1965 | Van Tuyle et al. | |
| 3,364,129 A | 1/1968 | Cremer et al. | |
| 3,365,383 A | 1/1968 | Blair | |
| 3,942,020 A | 3/1976 | Ciambrone | 250/539 |
| 3,967,131 A | 6/1976 | Slipiec et al. | 250/539 |
| 4,069,665 A | 1/1978 | Bolasny | 60/275 |
| 4,124,466 A | 11/1978 | Morrey | 204/157.1 R |
| 4,128,768 A | 12/1978 | Yamamoto et al. | 250/535 |
| 4,153,560 A | 5/1979 | Dinter et al. | 250/531 |
| 4,283,291 A | 8/1981 | Lowther | 250/536 |
| 4,410,495 A | 10/1983 | Bassler et al. | 422/186.18 |
| 4,417,966 A | 11/1983 | Krauss et al. | 204/176 |
| 4,656,010 A | 4/1987 | Leitzke et al. | 422/186.18 |
| 4,663,932 A | 5/1987 | Cox | 60/200.1 |
| 4,680,694 A | 7/1987 | Huynh et al. | 363/136 |
| 4,695,358 A | 9/1987 | Mizuno et al. | 204/174 |
| 4,790,980 A | 12/1988 | Erni et al. | 422/186.15 |
| 4,816,229 A | 3/1989 | Jensen et al. | 422/186.2 |
| 4,818,355 A | 4/1989 | Kanter et al. | 204/170 |
| 4,859,429 A | 8/1989 | Nisenson | 422/186.13 |
| 4,877,588 A | 10/1989 | Ditzler et al. | 422/186.19 |

(Continued)

OTHER PUBLICATIONS

Merriam-Webster's College Dictionary, 10th edition, p. 1106.*

(Continued)

*Primary Examiner*—Kishor Mayekar
(74) *Attorney, Agent, or Firm*—Wilmer Cutler Pickering Hale and Dorr, LLP

(57) ABSTRACT

A process and reactor for chemical conversion is taught. The process allows the selective breaking of chemical bonds in a molecule by use of fast rise alternating current or fast rise pulsed direct current, each fast rise portion being selected to have a suitable voltage and frequency to break a selected chemical bond in a molecule. The reactor for carrying out such a process includes a chamber for containing the molecule and a generator for generating and applying the selected fast rise current.

15 Claims, 9 Drawing Sheets

U.S. PATENT DOCUMENTS

| | | | |
|---|---|---|---|
| 4,891,600 A | 1/1990 | Cox | 328/233 |
| 4,910,637 A | 3/1990 | Hanna | 361/229 |
| 4,935,623 A | 6/1990 | Knauer | 250/251 |
| 4,956,582 A | 9/1990 | Bourassa | 315/111.21 |
| 5,009,858 A | 4/1991 | Mechtersheimer | 422/186.19 |
| 5,034,198 A | 7/1991 | Kaiga et al. | 422/186.07 |
| 5,089,098 A | 2/1992 | Tacchi | 204/176 |
| 5,091,069 A | 2/1992 | Hendrickson et al. | 204/176 |
| 5,094,822 A | 3/1992 | Dunder | 422/186.22 |
| 5,130,003 A | 7/1992 | Conrad | 204/176 |
| 5,135,725 A | 8/1992 | Hendrickson et al. | 422/186.15 |
| 5,145,350 A | 9/1992 | Dawson et al. | 422/186.15 |
| 5,169,606 A | 12/1992 | Batchelor | 422/186.19 |
| 5,215,636 A | 6/1993 | Danilychev et al. | 204/164 |
| 5,269,893 A | 12/1993 | Conrad | 204/176 |
| 5,285,372 A | 2/1994 | Huynh et al. | 363/136 |
| 5,308,649 A | 5/1994 | Babacz | 427/562 |
| 5,348,709 A | 9/1994 | Wheatley | 422/186.18 |
| 5,354,541 A | 10/1994 | Sali et al. | 422/186.07 |
| 5,364,600 A | 11/1994 | Stiehl et al. | 422/186.07 |
| 5,433,832 A | 7/1995 | Rich et al. | 204/164 |
| 5,433,927 A | 7/1995 | Mausgrover et al. | 422/186.07 |
| 5,437,843 A | 8/1995 | Kuan | 422/186.07 |
| 5,439,568 A | 8/1995 | Uchiyama | 204/164 |
| 5,458,856 A | 10/1995 | Marie et al. | 422/186 |
| 5,630,990 A | 5/1997 | Conrad et al. | 422/186.07 |
| 5,641,461 A | 6/1997 | Ferone | 422/186.16 |
| 5,667,756 A | 9/1997 | Ho | 422/186.18 |
| 5,879,641 A | 3/1999 | Conrad et al. | 422/186.07 |
| 6,001,315 A | 12/1999 | Conrad et al. | 422/186.04 |
| 6,309,514 B1 | 10/2001 | Conrad et al. | 204/164 |

OTHER PUBLICATIONS

Carlos M. Nunez et al., "Corona Destruction: An Innovative Control Technology for VOCs and Air Toxics", Air & Waste, Feb. 1993, vol. 43.

Toshiaki Yamamoto et al., "Control of Volatile Organic Compounds by an ac Energized Ferroelectric Pellet Reactor and a Pulsed Corona Reactor", IEEE Transactions on Industry Applications, May/Jun. 1992, vol. 28, No. 3.

J.M. Van Doren et al., "Chemistry and Structure of the $CH_2O_2^+$ Product of the $O_2^+ + CH_4$ Reaction", The Journal of Physical Chemistry, vol. 90, No. 12, 1986.

Akira Mizuno et al., "A Method for the Removal of Sulfur Dioxide from Exhaust Gas Utilizing Pulsed Streamer Corona for Electron Energization", IEEE Transactions on Industry Applications, vol. IA-22, No. 3, May/Jun. 1986.

B.V. Potapkin et al., "Effect of Catalytic Activity of Nonequilibrium Plasma In Chemical Reactions", Kurchatov Institute of Atomic Energy, Moscow, vol. 308, No. 4, pp. 897-900, Oct. 1989.

I. Sardja et al., "Plasma Oxidation of $SO_2$", Appl. Phys. Lett. 56, No. 1, Jan. 1, 1990.

Senichi Masuda et al., "Control of $NO_x$ by Positive and Negative Pulsed Corona Discharges", IEEE Transactions on Industry Applications, vol. 26, No. 2, Mar./Apr. 1990.

Moo Been Chang et al., "Gas-Phase Removal of NO from Gas Streams via Dielectric Barrier Discharges", Environ. Sci. Technol., vol. 26, No. 4 1992.

Jen-Shih Chang, "The Role of $H_2O$ and $NH_2$ on the Formation of $NH_4NO_3$ Aerosol Particles and De-$NO_x$ Under the Corona Discharge Treatment of Combustion Flue Gases", J. Aerosol Sci., vol. 20, No. 8, pp. 1087-1090, 1989.

Toshikazu Ohkubo et al., "$NO_x$ Removal by a Pipe with Nozzle-Plate Electrode Corona Discharge System", IEEE Transactions on Industry Applications, vol. 30, No. 4, Jul./Aug. 1944.

Diane Evans et al., "Plasma Remediation of Trichloroethylene in Silent Discharge Plasmas", J. Appl. Phys. vol. 74, No. 9, Nov. 1, 1993.

Daniel G. Storch et al., "Destruction Mechanisms for Formaldehyde in Atmospheric Pressure Low Temperature Plasmas", J. Phys. vol. 73, No. 1, Jan. 1, 1993.

\* cited by examiner

PROCESS AND APPARATUS FOR CHEMICAL CONVERSION

Continuation of application Ser. No. 09/781,316, filed on Feb. 13, 2001, now Pat. No. 6,448,819 which is a continuation of application Ser. No. 08/336,242, filed on Nov. 7, 1994, now Pat. No. 6,309,514, which is incorporated herein by reference in its entirety.

FIELD OF THE INVENTION

This invention is directed to a process and apparatus for chemical conversion and, in particular, a process and apparatus for selective molecular modification for manufacture or destruction of chemicals.

BACKGROUND OF THE INVENTION

Each chemical bond has a natural oscillating frequency at which the atoms move towards and away from each other. The natural oscillating frequency of a bond is constant at a given temperature and pressure and is dependent on the relative sizes of the bonded atoms, the geometry of the bonds, and the nature of adjacent bonds. Thus, a unique oscillating frequency is associated with each bond in a molecule, except where geometric symmetry exists. Where such symmetry exists, the symmetrical bonds have the same oscillating frequency.

SUMMARY OF THE INVENTION

A process and apparatus is provided for selectively breaking chemical bonds using an alternating current or pulsed direct current discharge having a suitable high frequency component. The continued application of a discharge at the suitable frequency will discourage the re-formation of the dissociated bond.

According to a broad aspect of the present invention there is provided a process for breaking a chemical bond in a molecule comprising: applying to the molecule a high voltage electrical discharge having a selected active high frequency component and at least sufficient amplitude to break the chemical bond.

According to a further broad aspect of the present invention there is provided an apparatus for breaking a chemical bond in a molecule, the molecule being in a gas or vapour state comprising: a reactor having a chamber for containing the molecule; and generator means for applying an electrical discharge current through the chamber, the discharge current having an active high frequency component which selectively breaks the chemical bond.

DESCRIPTION OF THE INVENTION

Chemical bond breaking is achieved by the use of a high frequency, high voltage alternating current or pulsed direct current discharge which is selected to have a waveform having a fast rise leading edge suitable for selectively breaking a selected bond in a particular type of molecule. Where there is a mixture of gasses, there will be selective breakage of the particular bond in the particular type of molecular target.

The fast rise portion of the waveform creates a range of high frequency components defined by the rate of change at each point on the slope in conjunction with the repetition rate (i.e. frequency) and the amplitude of the waveform. The time that the leading edge of a waveform is maintained at any given frequency combined with the voltage at that point give a potential energy transfer rate. To break a selected bond in a molecule, the leading edge of the waveform is selected to have a high frequency component which interferes with the bond, termed the "active frequency" or "active high frequency component". This active frequency is applied at a suitable voltage and maintained for a sufficient time to transfer enough energy to the molecule to break the bond.

It is believed that the active high frequency component is close to a primary or harmonic of the natural oscillating frequency of the selected bond and therefore creates constructive interference with the oscillation of any of the bonds which are in phase with the high frequency component. It is believed that suitable active frequencies are at least in the megahertz range. The active frequency is applied at a suitable voltage and is maintained for a sufficient time to transfer enough energy to the molecule to break the bond. It is believed that the suitable voltage is at least three times the combined strength of the bonds to be broken. It is further believed that an avalanche effect is create wherein further selected bonds are broken by those broken through the application of the active frequency. In such an effect, the release of bond energy causes the separated atoms to be high in energy and to collide with other molecules that have bonds weakened from the application of the current. Due to the collision, the weakened bonds are broken. Since it is believed that the applied active frequency can be a harmonic of the natural oscillating frequency, it is believed that there are many frequencies that are suitable for interference with any one bond. By "harmonic" in this disclosure it is meant not only integer multiples of the oscillating frequency of the bond, but also integer divisions. Many bond frequencies are of extremely high frequencies (in the Gigahertz range), and integer divisions of the resonating frequencies are easier to achieve than integer multiples.

In a reactor it is believed that substantially only the selected bonds are broken by applying a current having an active high frequency component and suitable voltage, since generally each bond in a molecule requires a unique frequency and minimum voltage for breakage. Selective breakage occurs even where other molecular species are present. However, due to ionization in the reactor and the impact of high energy atoms, some other bonds may be broken as well.

In an embodiment, a periodic wave form is generated having a leading edge selected to represent an active frequency for breaking a selected bond and sufficient voltage to break the bond once it is applied. In a continuous system, wherein molecules are being reacted and passed on, the flow rate of the molecules through the reactor must be considered and the voltage should be increased accordingly, to expose each portion of the gas or vapour containing the molecules to sufficient voltage to initiate bond breakage before the gas passes out of the reactor.

To carry out the process of the present invention, a current having a fast rise and sufficient voltage is applied to the gas or vapour form of a selected reactant. An active high frequency component for the bond which it is desired to break is determined and the waveform optimized by applying the discharge current to the reactant and adjusting the repetition rate or amplitude of a waveform or the inductance or capacitance of the circuit, transformer or reaction cell while monitoring the reaction by use of a means for chemical analysis, such as a mass spectrometer. In a preferred embodiment, the capacitance and inductance of the cell, circuit and transformer are maintained constant while the amplitude and repetition rate are adjusted to obtain the desired active frequency. Once determined, these parameters can be used for future chemical conversion involving that selected bond at substantially similar conditions of temperature and pressure in the reactor. Any changes in the voltage or the repetition rate of the applied discharge or changes in the inductance or capacitance of the circuit, transformer or reactor cell including any changes in reactor load, such as gas pressure, temperature, flow rate or composition, require reoptimizeation of the waveform to re-establish the active high frequency component. Such readjustment can be made manually or, in some cases, by use of a circuit feedback arrangement. In addition, in reactors produced for the same reaction and with similar geometry, the circuit can be optimized once and incorporated into each further reactor without resetting.

The present process is also useful for selective breaking of geometrically symmetrical atomic bonds in a molecule by first selecting an active high frequency component for the first bond. Once that bond has been broken, the removal of a further bond requires that a different active frequency be selected. Since, the natural oscillating frequency of a bond is dependent upon bond geometry and the nature of adjacent atoms, it is believed that the breakage of the first of the symmetrical bonds is accomplished by applying current at the primary or harmonic of the bond so that constructive interference of the bond oscillation occurs. Once this bond is broken, the oscillating frequency of the remaining symmetrical bonds changes and requires a different harmonic or primary frequency for constructive interference. The process allows geometrically symmetrical atomic bonds in a molecule to be broken independently and in any desired number.

A reactor for chemical modification according to the invention is provided comprising a cell for containing a gaseous or vaporised form of molecular species to be reacted, or a gas or vapour comprising at least a portion of the molecular species to be reacted, and means for applying to the cell a high frequency, high voltage alternating or pulsed direct current discharge within a plasma or corona discharge. The discharge is selected to have a high frequency component and amplitude which will selectively break a bond in a molecule. In one embodiment, the reactor comprises means for applying to the cell a discharge comprising a waveform having an active frequency component.

In another embodiment a capacitive-inductive resonating circuit is used to produce a carrier waveform having the required active frequency for the chemical conversion. The circuit is powered by any suitable power supply or source. The resultant waveform can be an alternating current or a pulsed direct current having an active frequency component. In a preferred embodiment, the current is an alternating current discharge having an active frequency component and is preferably generated and maintained, by an electronic circuit employing a saturable transformer having a feedback winding. The high frequency component is produced by "switching on" a transistor until the core of the transformer is magnetically saturated, as determined by the feedback winding or windings and the reaction cell. The "switch on" initiates oscillation at the circuit resonance frequency and once initiated the energy from the core of the transformer maintains the reaction. In an alternate preferred embodiment, the current is a high voltage direct current discharge having the active high frequency component added thereto.

In the preferred embodiment, the reactor cell acts as the capacitance in a parallel resonant circuit with the secondary winding of the transformer forming the inductor. The capacitive and inductive characteristics of the cell and inductor are chosen such that the circuit is essentially resistive at the desired active frequency. Energy transfer produces some heat and causes chemical modification by interfering with an breaking a specific bond of a molecule. Altering the capacitance or inductance of the reactor and the repetition rate and amplitude of the applied waveform provides two means of selecting which bonds are to be broken.

Since the presence of gas or vapour alters the capacitance of the resonant circuit, the electronic circuit of the present invention is capable of compensating for changes in reactor loading such as the gas flow rate, gas density, gas composition or gas temperature by sensing the changes in the dielectric constant of the gas. Changes in the dielectric constant of the gas cause the current of the discharge in the reactor to change, and hence the feedback winding changes the operating parameters to maintain the required active frequency for specific chemical modification.

In an embodiment, an energy efficient reactor is provided wherein the transformer and electronics are impedance matched to the reactor circuit. Impedance matching in the reactor circuit can be provided by modifying the electrode geometry such as, for example, by winding a selected number of turns of a conductive element, such as wire, in communication with the high voltage or ground electrodes, by forming the high voltage electrode as a spiral having a predetermined pitch and length or by separating the electrodes by a selected distance.

In another embodiment, node reflection and wave form destruction in the reactor is minimized by, for example, selection of the length of the high voltage electrode and reactor length to prevent reflection of the wave and destructive interference thereof.

The apparatus of the present invention can be used in series with a plurality of heat exchangers of sequentially reducing temperatures which selectively condense, and thereby separate, various constituents of the fluid after treatment. It is preferred that a flowing stream of fluid be fed to the reactor such that a continuous process for chemical modification is provided. Since the application of current at the active frequency will discourage the reformation of selected bonds, this process can be used in combination with other reactors wherein the streams of modified products can be caused to converge to react together chemically to create reaction products. Any reactor must be built having regard to the corrosion problems of the fluid to be introduced and formed in the reactor.

To increase the output of reaction products by the reactor, the length of the reactor can be extended or a plurality of reaction cells can be used in series or parallel. In such arrangements, an electrical control can be provided to detect malfunction in any portion of the reactor and cause the reactor to be shut down.

Since the molecular species to be reacted must be in a gas or vapour state, in an embodiment the reactor is constructed so as to be capable of vaporizing a liquid therein by application of heat or modification of internal pressure.

BRIEF DESCRIPTION OF THE DRAWINGS

A further, detailed description of the invention, briefly described above, will follow by reference to the following drawings of specific embodiments of the invention, which depict only typical embodiments of the invention and are therefore not to be considered limiting of its scope. In the drawings.

DETAILED DESCRIPTION OF THE INVENTION

Figure 1:
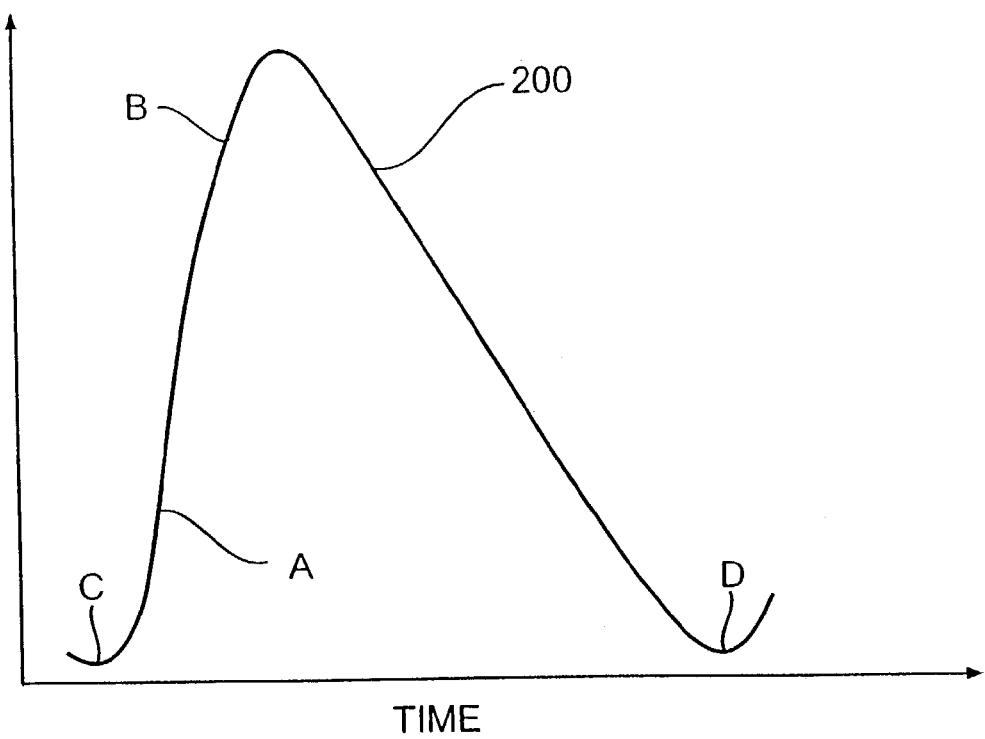
FIG. 1 shows a waveform useful in the present invention.

Referring to FIG. 1 of the drawings, a carrier waveform 200 is shown. The slope of the leading edge of the waveform shown between A and B creates a range of high frequency components. These frequencies are created by the rate of change at each point on the slope in conjunction with the repetition rate and the amplitude of the waveform. The time that the waveform remains at any given frequency combined with the voltage gives a potential energy transfer rate. While the actual slope or rate of increase between A and B will vary (unless adjusted) with the repetition rate of the entire waveform (i.e. the interval between C and D), it is the slope between A and B and not the repetition rate that is the significant factor in the chemical conversion. The repetition rate of the waveform determines how often the active frequency component is developed.

The various points between A and B provide a series of high frequency components. The slope of the leading edge of the waveform can be adjusted to select the active frequency for the breakage of a selected bond. This frequency must be delivered at a sufficient voltage to break the desired bond. Therefore, the slope should adjusted so that the active frequency is delivered at a sufficient voltage to deliver enough energy to break the bond. When the active frequency is determined for a selected bond the slope between A and B is then flattened out to tune in on that active frequency to optimize the reaction.

Figure 2:
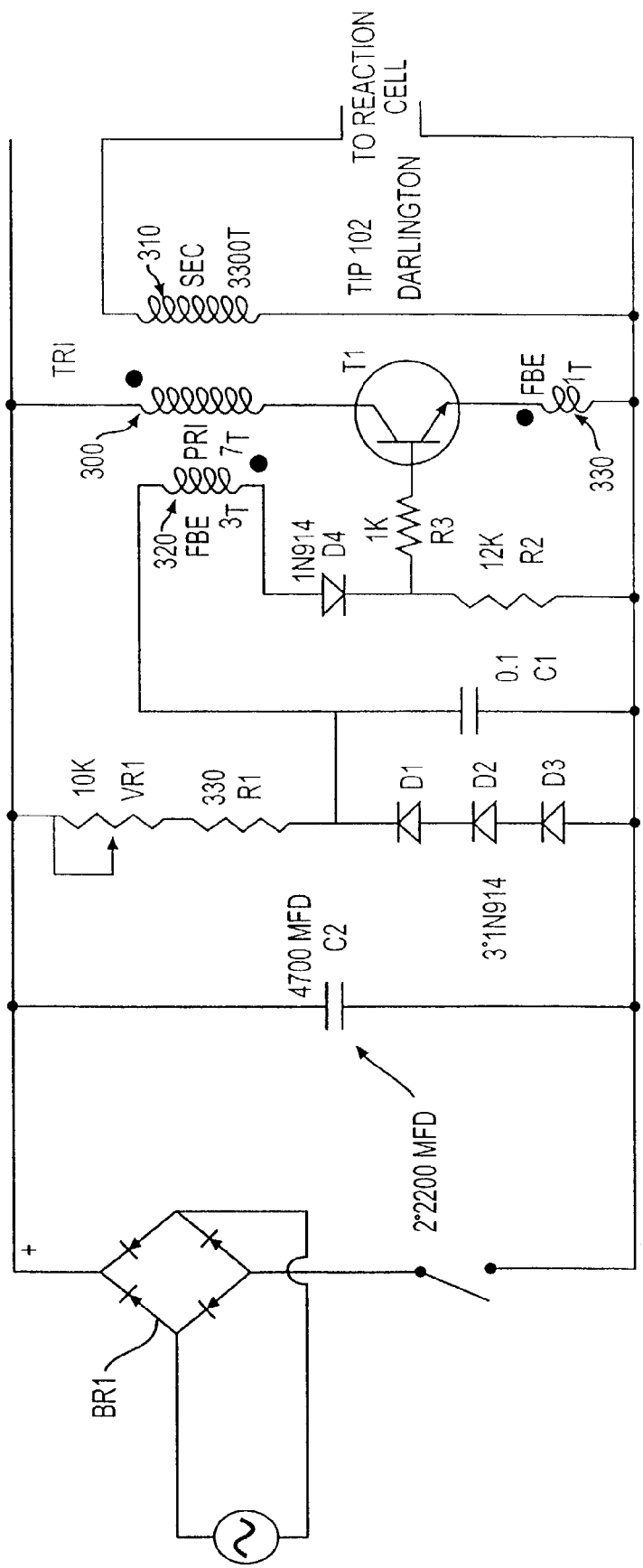
FIG. 2 shows a circuit diagram of an electronic circuit useful in the present invention for generating the waveform of FIG. 1.

Referring to FIG. 2 of the drawings, the preferred circuit for generating the waveform shown in FIG. 1 is shown. The circuit comprises a Darlington pair transistor T1 and a ferrite core transformer TR1. The transformer TR1 has four windings, the primary winding 300, a secondary (output) winding 310, and two feedback windings 320 and 330. The primary winding 300 connects the collector of the transistor T1 to the positive power supply voltage. The secondary winding 310 is the output of the reactor circuit and is applied to one of the electrodes of the reactor cell shown in FIG. 3. The feedback winding 320 is connected via diode D4 and R3 to the base of the transistor T1. The other terminal of the feedback winding 320 is connected to the biasing circuit of the transistor T1, which comprises variable resistor VR1, resistor R1 and resistor R2, as well as silicon switching diodes D1, D2 and D3. The feedback winding 330 connects the emitter of the transistor T1 to the negative terminal of the power supply. The circuit operates as follows.

Transistor T1 is present to permit generation of a fast rise waveform. In a circuit which is intended to produce pulsed DC waveforms, one transistor T1 is used. If it is desired to produce AC waveforms, a second transistor (not shown) is used. As the transistor T1 is handling a high peak current, a heat sink to dissipate the heat generated by such current should be used.

Transformer TR1 is a saturable transformer having a ferrite core material with very low losses. In a preferred embodiment, TR1 has a ferrite core comprising a 7 turn primary winding 300, a 3 turn feedback winding 320, a 1 turn feedback winding 330 and a secondary winding 310 having 3300 turns; all of 22 gauge wire.

The diodes D1, D2, D3, and D4 are silicon switching diodes that are selected to have voltage and temperature characteristics which correspond the Darlington transistor. Diodes D1, D2 and D3 give a regulated "switch on" voltage for transistor T1. Diode D4 acts to prevent the negative feedback voltage turning the base-emitter junction of transistor T1 back "on" by reverse voltage avalanche breakdown. Any similar silicon switching diode to IN914 can be used for diodes D1, D2, D3, and D4.

Variable resistor VR1 and fixed resistor R1 regulate the current to maintain the voltage across the diodes and bias the base of the transistor T1. Variable resistor VR1 is used to set the operating current, compensating for different gain of transistors. Resistor R1 acts to limit the current when variable resistor VR1 is set to 0. Alternatively, a fixed value resistor of suitable resistance for the transistor used, can replace both R1 and VR1.

Feedback winding 330 is connected to the emitter of the transistor. It provides compensation for change of gain versus temperature, and provides some compensation for transistors of different gain. Winding 330 is most useful in high power reactors. However, since it also acts to damp harmonics in the system, which would interfere with the desired active frequency, it is preferably included in all circuits.

Capacitor C1 reduces variations in the supply voltage reaching the base of transistor T1 during normal operation. This is important in high current reactors. Due to the high switching current, smoothing capacitors C1 and C2 must each handle high peak ripple currents and must be rated accordingly.

Power is applied to the circuit by an AC source, as shown. The current within the circuit is preferably 12 volt DC. Therefore where 120 volt power is used a step down transformer is required prior to the bridge rectifier BR1. The bridge rectifier is useful even where the power supply is a battery, since the rectification allows connection of the battery without concern as to matching terminals.

After power is applied to the circuit, the base of transistor T1 is driven positive and the collector current increases. For the purposes of this description, it is assumed that the circuit has been operating for some time and that we are starting the description from the point where the base of transistor T1 is being driven positive and the collector current is increasing.

With transistor T1 fully switched on, the current through the primary winding of TR1 transformer increases at a rate set by the transformer inductance and the reactor capacitance. As the current increases, the transformer core magnetizes, and a voltage is induced into the base feedback winding 320. The negative going end of feedback winding 320 is connected to the voltage reference diodes D1, D2, D3 and the positive going end connected through diode D4 to resistor R2 and the base of transistor T1. Thus, an induced voltage in feedback winding 320 acts to maintain transistor T1 "on". The actual drive current is set by the value of the resistors VR1 and R1.

Resistor R3 together with the base input capacitance of transistor T1 reduces current oscillation at very high frequency during switching. Preferably, resistor R3 is connected directly at the base of transistor T1.

As the transformer core approaches saturation, the rate of current increase drops. As it drops, the induced voltage in the base feedback winding reduces thus reducing the drive to the transistor which then starts to turn off. This reduces the rate of increase of the collector current through primary winding 300 and this in turn further and further reduces the feedback voltage. This very rapidly turns the transistor fully off. As the core magnetic field is no longer being maintained by the transistor, the magnetic field collapses reversing the voltage in the base feedback winding 320 and placing a negative voltage on the anode of diode D1 turning it off thus keeping transistor T1 turned off. This also effectively unloads the feedback winding 320 and prevents any damping of the now oscillating secondary winding 310.

As the current drops towards zero across the base feedback winding 320, the generated negative voltage across the base feedback winding 320 decreases until it no longer cancels the bias voltage at the cathode of diode D1. When this happens, the transistor starts to turn on. As it does, the current starts increasing and this in turn reverses the voltage in the base feedback winding 320. This applies additional positive voltage to the base of transistor T1 turning it fully on and into full saturation. Now the transistor is turned fully on and the collector current increases, which is where the cycle repeats.

Figure 3:
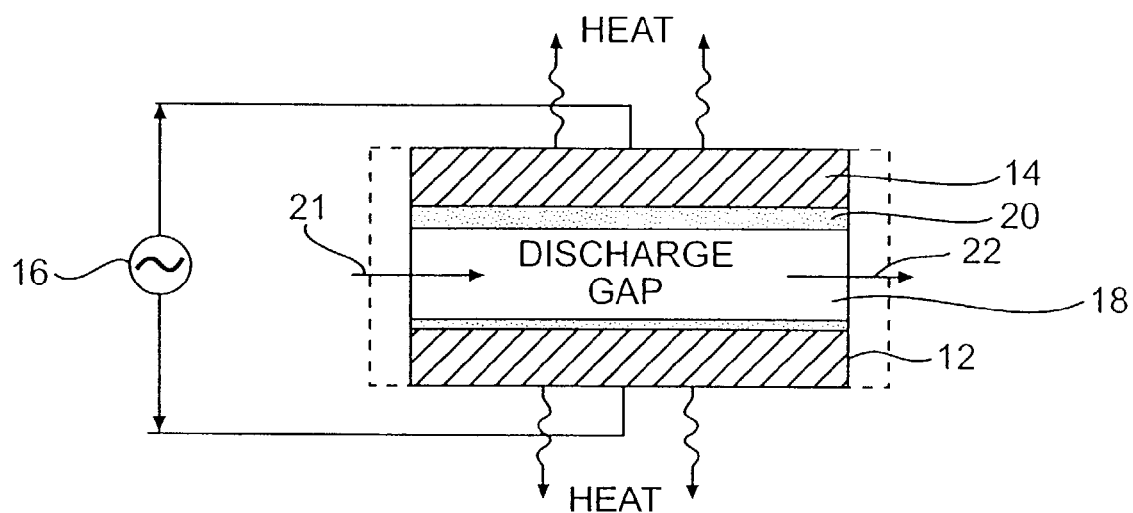
FIG. 3 shows a side sectional view of a reactor useful in the present invention.

Referring to FIG. 3, a reactor 10 is shown which is useful in the selective breaking of an atomic bond within the molecules of a fluid. Reactor 10 comprises a first electrode 12 and a second electrode 14. A sheet of dielectric material 20 is mounted on electrode 14 on a side proximate electrode 12. Electrodes 12, 14 are electrically connected to the output of the circuit of FIG. 2. Thus, a waveform generally as shown in FIG. 1 is applied between electrodes 12 and 14, causing plasma discharge through gap 18. A gas or vapour comprised of at least a portion of a molecular species to be modified is introduced to reactor 10 and is present in gap 18.

The gas or vapour to be modified preferably passes in a continuous stream through gap 18, as indicated by the arrows, between inlet 21 and outlet 22. The parameters of the applied current are optimized by analyzing fluid exiting through outlet 22 by use of chemical analyzers, such as a mass spectrometer, and adjusting the tuned circuit to change the shape of the waveform slightly until output is optimized. The application of energy at the active frequency acts to break selected bonds in the reactant by interfering with the selected bond. Such a reaction produces heat which passes through electrodes to the exterior of the reactor.

Figure 4:
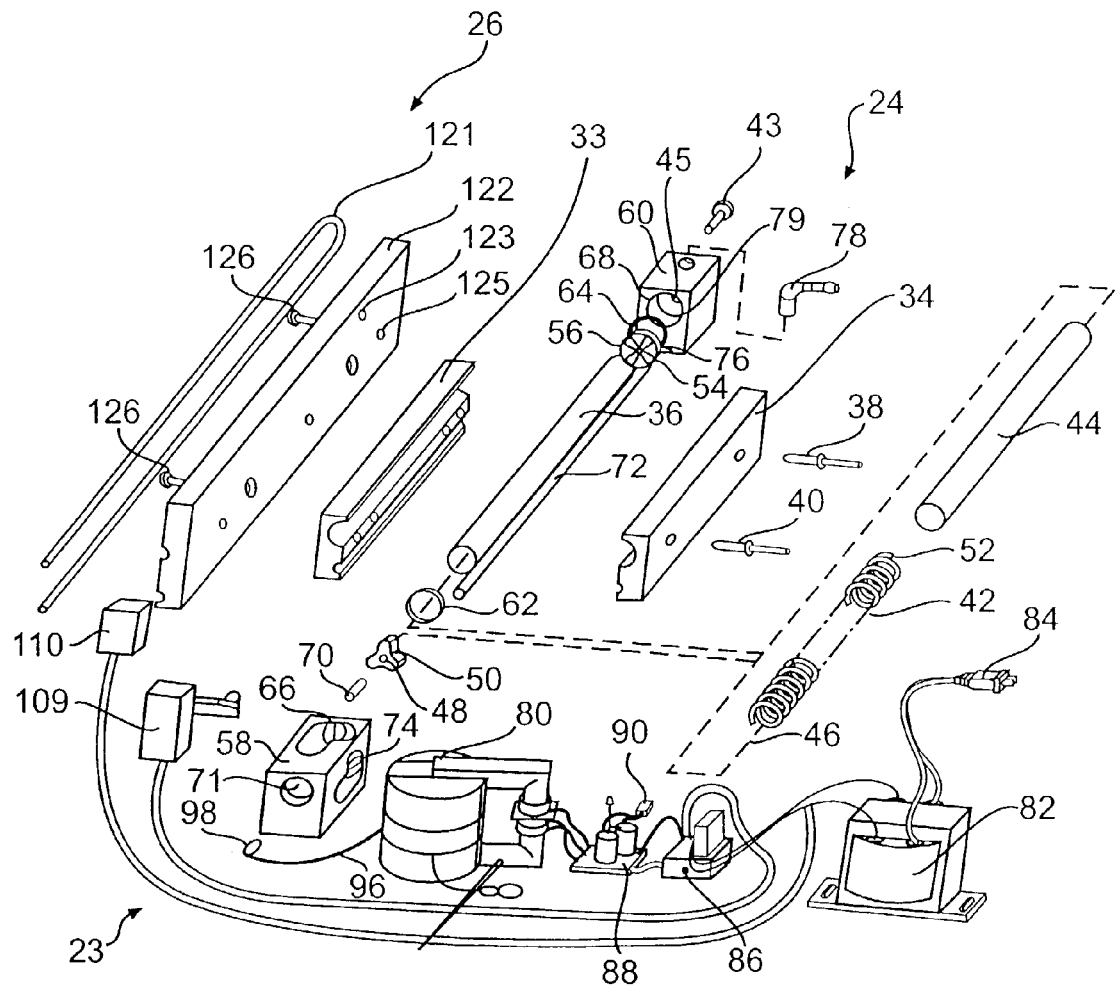
FIG. 4 shows an exploded, partially cut away view of a reactor useful in the present invention.

Referring to FIG. 4, a preferred reactor for carrying out the present process is shown. The reactor comprises an apparatus 23 for producing a periodic waveform having an active frequency, a reaction chamber 24 and a heat sink arrangement 26 associated with apparatus 23 and reaction chamber 24.

Reaction chamber 24 comprises ground electrodes 33 and 34 having corresponding grooves formed therein for accommodating and contacting dielectric tubular member 36. Electrodes 33, 34 are secured about member 36 by pop rivets 38 and 40.

Disposed within member 36 is high voltage spiral electrode 42 consisting of corrosion resistant metal, having regard to the fluid to be reacted, or likewise corrosion resistant semiconductive material. The pitch and length of electrode 42 is selected to impedance match the impedance of apparatus 23. In addition, the length of electrode 42 is selected to prevent node reflection of the required waveform. A screw 43 formed of a suitable dielectric material is inserted through an aperture 45 formed in end block 60 to be in engagement with an end 52 of electrode 42 by the resiliency formed in the electrode. Screw 43 allows external adjustment of the length of electrode 42 by compressing or allowing extension of electrode 42. A dielectric member 44 acts as a filler and support for spiral electrode 42. An end portion 46 of spiral electrode 42 is inserted into central aperture 48 of centering triangle 50. The other end 52 of spiral electrode 42 is inserted into central aperture 54 of centering triangle 56. Tubular dielectric member 36 containing spiral electrode 42 and associated parts 44, 50, 56 is inserted between apertures 66, 68 of end blocks 58 and 60, formed of suitable dielectric material, respectively. Sealing means, such as O-rings 62, 64 are provided to seal the connection between tubular member 36 and the end blocks against passage of gas. A high voltage pin 70 is inserted into aperture 48 of centering block 50 to be in electrical communication with end 46 of spiral electrode 42.

A current collector 72 formed as a tubular member from corrosion resistant metal is sealably secured such as by press fitting at its ends into apertures 74 and 76 of end blocks 58 and 60, respectively. Current collector 72 acts mechanically to join and form a gas tight channel between end blocks 58 and 60. Electrodes 33 and 34 accommodate and make contact with current collector 72. Since electrodes 33 and 34 are at ground potential during operation and are in intimate contact with current collector 72, current collector 72 serves to prevent electrical current from passing out of the reaction chamber should any conductive fluid back up into the reaction chamber and come in contact with electrode 42 during use.

A stream of gas or vapour containing at least a portion of molecular species to be reacted is provided to the reactor through entry nozzle 78 into an upper chamber of block 60. The gas is directed into and passes through dielectric tubular member 36 and about spiral electrode 42 into end block 58. Dielectric member 44 acts within dielectric member 36 to direct the fluid into close association with spiral electrode. The spiral configuration, in addition to providing impedance in the reactor, acts to create turbulence in the passing fluid stream and thereby enhance mixing and heat transfer to electrodes 33, 34. Fluid returns along the bore of current collector 72 to enter a lower chamber of block 60 where an outlet is provided from the reactor. Fluid passing through this system is modified when passing through dielectric tubular member 36 by application of a selected active frequency current applied through electrode 42. Current is provided to electrode 42 by apparatus for producing current 23.

To allow formation of a vacuum within the gas flow path, and thereby vaporization of liquids within the reactor, the chamber is substantially airtight.

Apparatus for producing current 23 is comprised of a circuit as generally described in reference to FIG. 2 including among its components a high voltage transformer 80, a low voltage transformer 82, a bridge rectifier 86, a switch 109, transistor 90 and associated electronics 88. The low voltage transformer 82 is provided with fluctuating power such as alternating current by means of plug 84. The current produced by apparatus 23 is communicated to the reactor through a high voltage wire 96 having a plug 98 on an end therefor for making contact with high voltage pin 70 in end block 58. Switch 109 is sensitive to pressure and interrupts the power flowing from the transformer 82 to the electronics 88 when end block 58 is moved away from plug 98.

When the high frequency, high voltage current is applied to the fluid in the reactor, heat is generated. A heat sink 26 is provided in association with reaction chamber 24 to dissipate heat generated in the reactor. Heat sink 26 comprises a thermally conductive tube 121, for conducting a suitable coolant, which is inserted into a heat sink block 122. Holes in the heat sink block 122 include a threaded hole 123 to mount the transistor 90 and a threaded hole 125 to mount the bridge rectifier 86. Heat sink block 122 is firmly mounted to ground electrodes 33 and 34 through conductive screws 126 which also act to ground electrodes 33 and 34.

Figure 5:
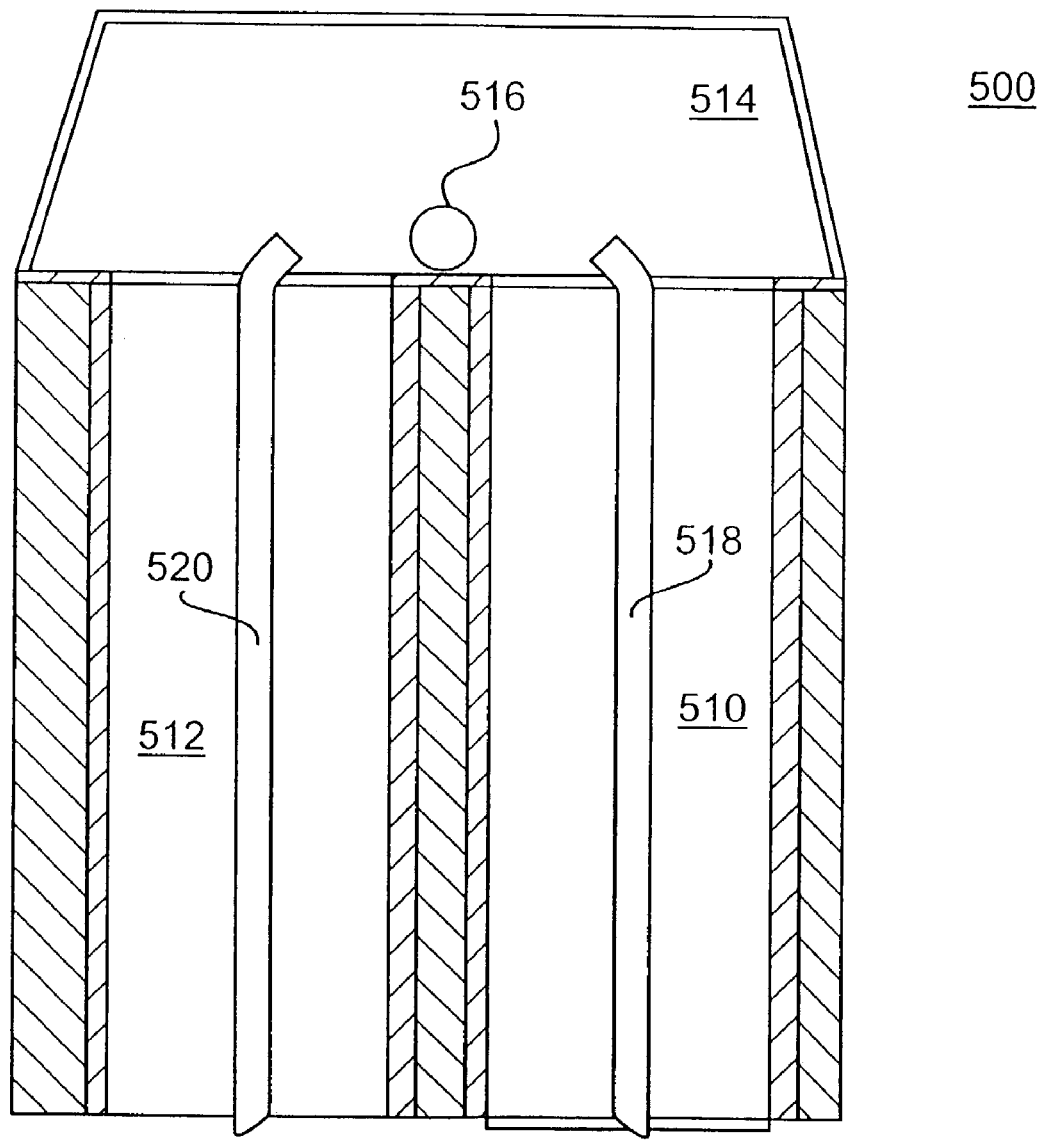
FIG. 5 shows a sectional view of a chemical reactor useful in the present invention.

Referring to FIG. 5 there is shown a chemical reactor 500 comprising two reaction cells 510, 512, of the present invention, in parallel, and providing output streams of reaction products into a reaction chamber 514 where the chemicals are allowed to combine and react. Reaction products are passed out of reaction chamber 514 via port 516. High voltage electrodes 518, 520 extend into the reaction chamber such that the application of current can be maintained to discourage reformation of dissociated chemical bonds. Within chamber 514 high voltage electrodes are spaced apart a distance greater than the voltage differential of the electrodes.

Figure 6:
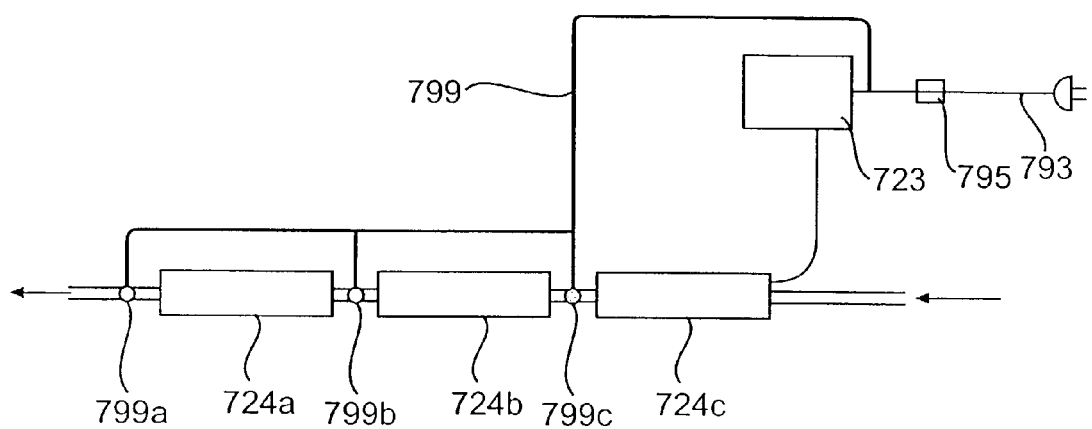
FIG. 6 shows a schematic diagram of a reactor system according to the present invention.

As shown schematically in FIG. 6, the output of reaction products by the present reactor can be increased by providing a reactor system comprising a plurality of reaction chambers 724a, 724b and 724c in series. Problems in scale-up, such as reconfiguration of enlarged reactors, are thus avoided by installing optimized reactors in greater numbers. To control the passage of untreated gas through the system, in case of system failure, valves 799a, 799b and 799c are provided in the outlet of each chamber so that gas can flow from chamber 724c through chamber 724b and then through chamber 724a. These valves are held open in normal operation by power supplied via line 797, which is in series with the apparatus 723 for producing current. Where the system fails, such as by dielectric breakdown, a current-sensitive protective device 795, such as a fuse or circuit breaker, in the power supply 793 senses the increase in current flow and stops power to the system. Valves 799a, 799b, and 799c then stop the flow of gas through the chambers 724a, 724b and 724c until the flow of current is resumed, thereby preventing output of any unreacted gas through the system.

The invention will be further illustrated by the following examples. While the examples illustrate the invention, they are not intended to limit its scope.

EXAMPLE 1

Air at atmospheric pressure and 26° C. was dehumidified so that it had a dew point between 35° and 40° F. The air was introduced to a reactor generally as described in reference to FIG. 4 at a flow rate of 3 l/minute. Air exiting the reactor was passed to an ozone monitor for analysis.

Figure 7:
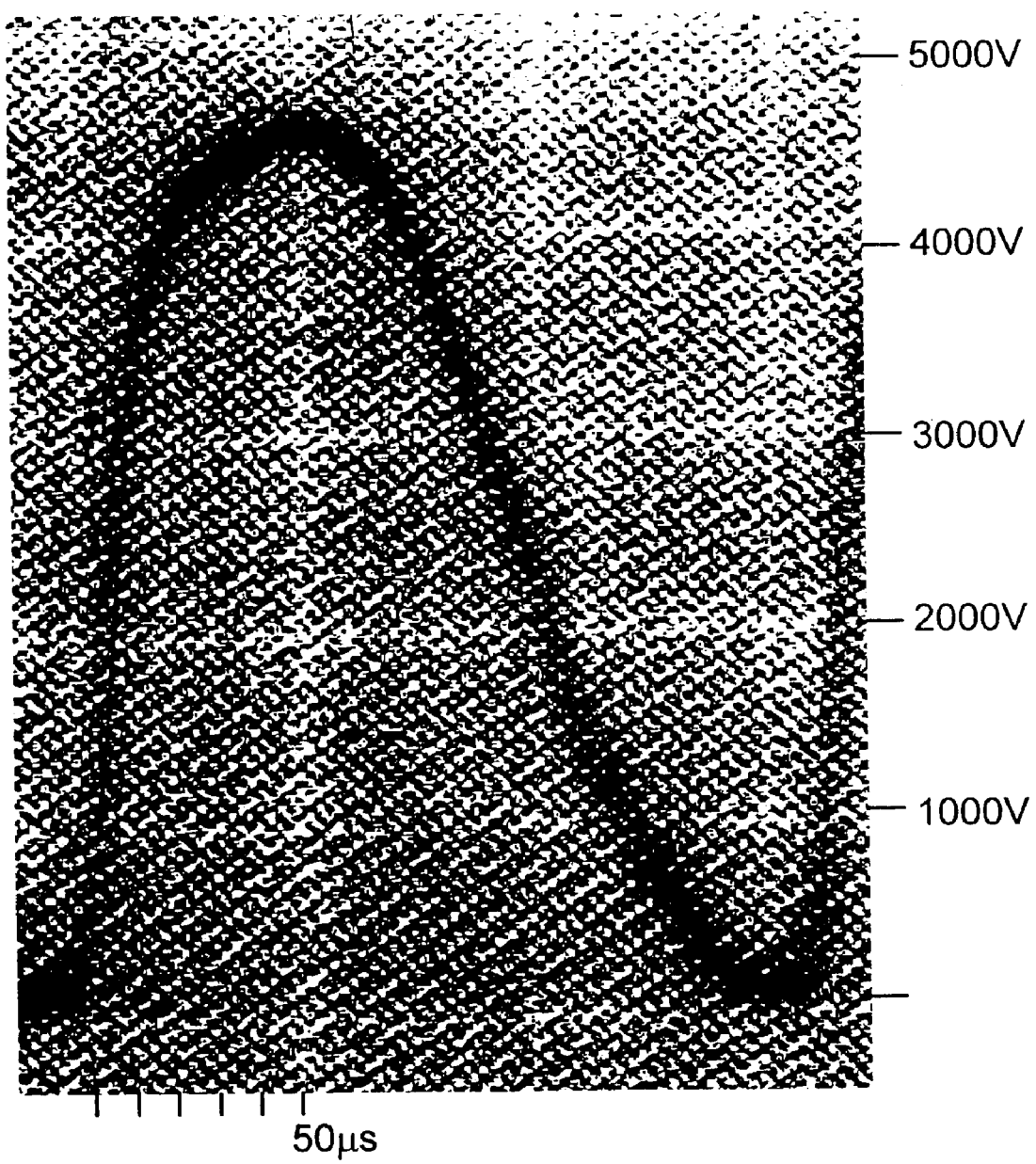
FIG. 7 shows an oscilloscope representation of a waveform useful in the production of ozone from oxygen according to the present invention.

To the air was applied electrical discharges as follows:
1. A sinusoidal waveform having a frequency of 60 Hz and varied between 5,000 and 8,000 volts;
2. A sinusoidal waveform having a frequency of 6.5 kHz and ranging between 5,000 and 8,000 volts;
3. A square waveform having a frequency of 6.5 kHz and ranging between 5,000 and 8,000 volts; or,
4. A waveform according to FIG. 7 having a repetition rate of 6.67 kHz and an amplitude of 4,500 volts. From the oscilloscope, calculations of the slope of the substantially straight portion of the leading edge between A and B indicate that the rate of voltage rise is in the order of $6.6 \times 10^6$ volts/second.

Typical ozone production results by use of waveforms 1 to 4 for treatment of air are summarized in Table 1.

TABLE 1

| Waveform | Ozone concentration (% by weight) |
| --- | --- |
| 1 | 0.001 |
| 2 | 0.066 |
| 3 | 0.066 |
| 4 | 0.332 |

EXAMPLE 2

Halon 1301 ($CF_3Br$) at 2.5 psi and 20° C. was introduced to a reactor, generally as described in reference to FIG. 4 at a flow rate of 3 l/minute. Reactor output was analyzed by observing the gas coloration and odour for production of bromine gas. In addition, reacted gas was passed to a mass spectrometer for halon conversion analysis.

To the halon 1301 was applied electrical discharges as follows:
1. A sinusoidal waveform having a frequency of 60 Hz and varied between 12,000 and 15,000 volts;
2. A range of sinusoidal waveforms having frequencies ranging between 5,000 and 7,000 Hz and amplitudes ranging between 5,000 and 8,000 volts;
3. A range of square waveforms having frequencies ranging between 5,000 and 7,000 Hz and amplitudes ranging between 5,000 and 8,000 volts; or,
4. A waveform according to FIG. 1 having a repetition rate ranging between 5,000 and 7,000 Hz and an amplitude of between about 4,500 and 5,000 volts.

Typical halon conversion results by use of waveforms 1 to 4 are summarized in Table 2.

TABLE 2

| Waveform | Reacted gas colour | Halon conversion (%) |
| --- | --- | --- |
| 1 | colourless | trace |
| 2 | light brown | trace |
| 3 | light brown | trace |
| 4 | strong, reddish brown | 12% |

It was determined that the reaction by use of a fast rise waveform according to the process of the present invention resulted in the conversion as follows:

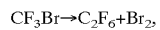

at a rate of 12%. Only trace conversion of halon was obtained by use of the sinusoidal and square waveforms.

Similar halon conversion results were obtained using Halon 1211, ($CF_2COBr$).

EXAMPLE 3

Air at atmospheric pressure and 22° C. and having a relative humidity of 80% was introduced at a flow rate of 3.8 l/min to reactors, generally as described in reference to FIG. 4 without the use of a heat sink and having the parameters as set out in Table 3.

TABLE 3

|  | Reactor A | Reactor B |
| --- | --- | --- |
| Length | 12 inch | 4 inch |
| Capacitance (at frequency = 0) | 147 pF | 34 pF |
| Resonance | 58.2 Mhz | 66.0 Mhz |
| Inductance | 0.0508 uH | 0.170 uH |

The measurements for the reaction chambers were carried out in 18° C., atmospheric pressure and 70% RH using a MIC37 multimeter and a MFJ HF/VHF SWR analyzer, to measure capacitance and resonance, respectively. Inductance was calculated for the system.

The waveforms were monitored using a Phillips PM3365A 100 MHz Oscilloscope set at 5 VDC and 0.1 ms connected to a Techtronix P6015 1000x probe. Air exiting the reactor was passed to an ozone monitor for analysis.

Figure 8A:
FIGS. 8A and 8B show oscilloscope representations of waveforms useful in the production of ozone from oxygen according to the present invention; and, FIGS. 9A and 9B show oscilloscope representations of waveforms useful in the debromination of halon 1301 according to the present invention.
Figure 8B:
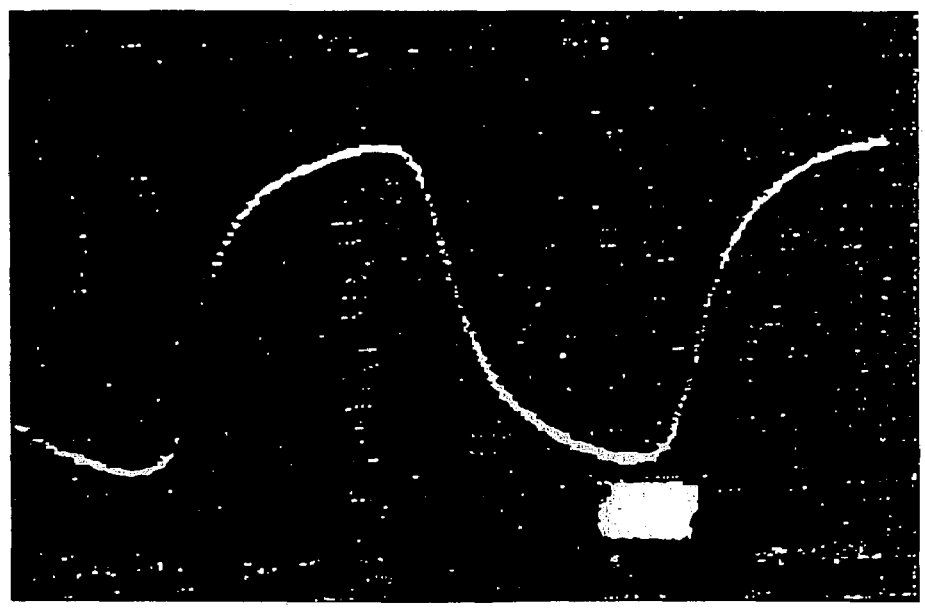

The waveforms which were found to produce optimum amounts of ozone for reactor A and reactor B are shown in FIGS. 8A and 8B, respectively. The waveform parameters and ozone production results are shown in Table 4.

TABLE 4

|  | Reactor A | Reactor B |
| --- | --- | --- |
| Repetition rate (Hz) | 1603 | 1637 |
| Voltage (kV) | 20 | 22 |
| Leading edge rate of voltage increase (V/s)* | 234 × 10$^6$ | 233.5 × 10$^6$ |
| Ozone concentration (% by weight) | 0.190 | 0.145 |

*determined from oscilloscope

The active frequency for ozone production is uniform for gas having the same flow rate, temperature and pressure regardless of the reactor parameters. The active frequency can be determined for each reactor by adjusting the amplitude and repetition rate of the waveform.

EXAMPLE 4

Using reactors A and B, halon 1301 at atmospheric pressure and 22° C. was introduced to each reactor at a flow rate of 4.5 l/minute. The leading edge of the applied current discharge was monitored using an oscilloscope, as described in Example 3 and was tuned to optimize debromination of the halon as determined by observing the reacted gas coloration and odour for production of bromine gas.

Figure 9A:
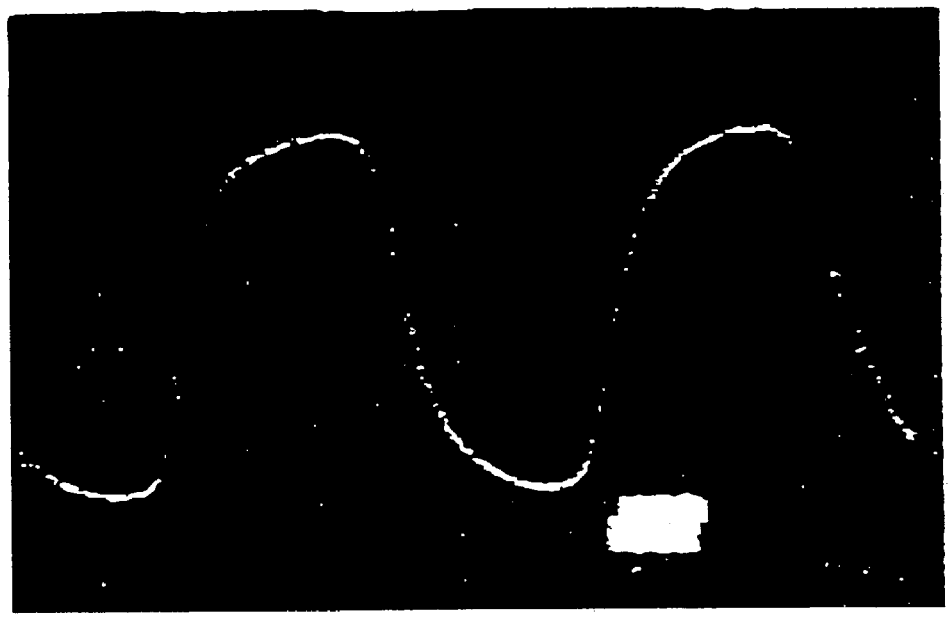
Figure 9B:
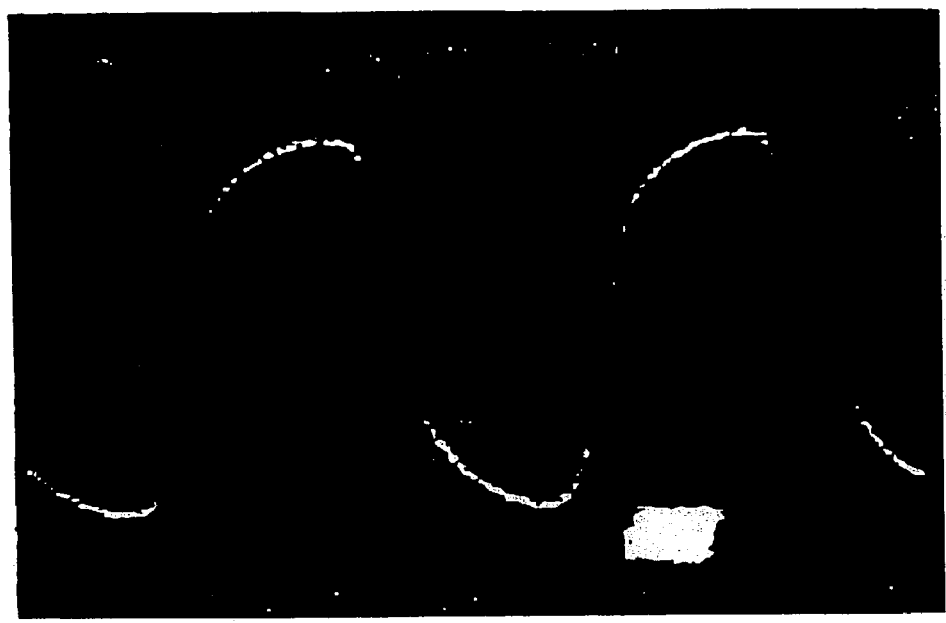

The waveforms which were found to produce a gas having a dark reddish brown output gas and strong odour for reactor A and reactor B are shown in FIGS. 9A and 9B, respectively. The waveform parameters are shown in Table 5.

TABLE 5

|  | Reactor A | Reactor B |
| --- | --- | --- |
| Repetition rate (Hz) | 2088 | 2012 |
| Voltage (kV) | 25 | 25 |

TABLE 5-continued

|  | Reactor A | Reactor B |
| --- | --- | --- |
| Leading edge rate of voltage increase (V/s)* | 384.6 × 10$^6$ | 386.0 × 10$^6$ |

*determined from oscilloscope

EXAMPLE 5

Air at atmospheric pressure and 22° C. and having a relative humidity of 80% was introduced at a flow rate of 3.8 l/min to reactor A as described in Example 3. The waveform was monitored using a Phillips PM3365A 100 MHz Oscilloscope set at 5 VDC and 1 ms connected to a Techtronix P6015 1000x probe. Air exiting the reactor was passed to an ozone monitor for analysis.

The waveform was changed from waveform 1, having a slower rate of voltage increase than the waveform of FIG. 8A, to waveform 2, according to FIG. 8A, by adjusting the power to the reactor. Results are shown in Table 5.

TABLE 6

| Waveform | Ozone Concentration (% by weight) |
| --- | --- |
| 1 | 0.021 |
| 2 | 0.190 |

It will be apparent that many other changes may be made to the illustrative embodiments, while falling within the scope of the invention and it is intended that all such changes be covered by the claims appended hereto.

What is claimed is:

1. An apparatus for breaking a chemical bond in a molecule, the molecule being in a gas or vapor state, the apparatus comprising:
   a chamber for containing the molecule having two separate electrodes; and
   an electrical signal generator configured to apply to the electrodes a periodic waveform having a fast rising leading edge and having a suitable voltage, to at least partially ionize the molecule selectively to break the chemical bond.

2. The apparatus as claimed in claim 1 wherein the fast rising leading edge includes a portion having a constant slope.

3. The apparatus as claimed in claim 1 wherein the suitable voltage includes a range of voltages having an adjustable voltage increase rate.

4. The apparatus as claimed in claim 3 wherein the voltage increase rate of the fast rising leading edge is adjusted to optimize the break down of the chemical bond.

5. The apparatus as claimed in claim 4 wherein the voltage increase rate of the fast rising leading edge is substantially equal to 6.6×10$^6$ volts/second, to thereby produce ozone gas from air.

6. The apparatus as claimed in claim 4 wherein the voltage increase rate of the fast rising leading edge is substantially equal to 234×10$^6$ volts/second, to thereby produce ozone gas from air.

7. The apparatus as claimed in claim 4 wherein the voltage increase rate of the fast rising leading edge is substantially equal to 233.5×10$^6$ volts/second, to thereby produce ozone gas from air.

8. The apparatus as claimed in claim 4 wherein the voltage increase rate of the fast rising leading edge is substantially equal to $384.6 \times 10^6$ volts/second, to thereby produce bromine gas from Halon 1301 ($CF_3Br$).

9. The apparatus as claimed in claim 4 wherein the voltage increase rate of the fast rising leading edge is substantially equal to $386 \times 10^6$ volts/second, to thereby produce bromine gas from Halon 1301 ($CF_3Br$).

10. The apparatus as claimed in claim 1 wherein the molecule is oxygen and at least a portion of the oxygen is ionized in the chamber to form ionized oxygen, at least a portion of the ionized oxygen recombines to form ozone and the apparatus further comprises an outlet in fluid communication with the chamber for receiving the ozone.

11. The apparatus as claimed in claim 1 wherein the electrical signal generator further comprises:

a capacitive component of a resident circuit formed by the two electrodes.

12. The apparatus as claimed in claim 1 wherein the periodic waveform further comprises a slow falling trailing edge.

13. The apparatus as claimed in claim 1 further comprising:

an output transformer forming an inductive component configured to apply the periodic waveform across the two electrodes.

14. The apparatus as claimed in claim 1 wherein the electrical signal generator further comprises:

a capacitive-inductive resonating circuit.

15. The apparatus as claimed in claim 1 wherein the electrical signal generator further comprises:

a saturable transformer having a feedback winding.

* * * * *